United States Patent [19]

Miller

[11] Patent Number: 4,551,255
[45] Date of Patent: Nov. 5, 1985

[54] CONTINUOUS FILTER SCREEN SYSTEM FOR REMOVING PARTICLES FROM A LIQUID

[75] Inventor: R. Craig Miller, 12957 Glenda St., Cerritos, Calif. 90701

[73] Assignees: R. Craig Miller, Cerritos; Pro/Pak Industries, Inc., Fullerton, both of Calif. ; a part interest

[21] Appl. No.: 661,609

[22] Filed: Oct. 17, 1984

[51] Int. Cl.$^4$ ............................................. B01D 33/02
[52] U.S. Cl. ................................... 210/770; 210/783; 210/806; 210/393; 210/400
[58] Field of Search ............... 210/770, 783, 805, 806, 210/196, 329, 393, 396, 397, 400

[56] References Cited

U.S. PATENT DOCUMENTS

| | | | |
|---|---|---|---|
| 3,517,819 | 6/1970 | Helland | 210/400 |
| 3,531,404 | 9/1970 | Goodman et al. | 210/400 X |
| 3,537,584 | 11/1970 | MacDonald et al. | 210/400 X |
| 3,617,555 | 11/1971 | Ginsburgh et al. | 210/400 X |
| 3,899,426 | 8/1975 | Hirs | 210/400 X |
| 4,039,450 | 8/1977 | Brown | 210/400 X |
| 4,390,428 | 6/1983 | Bratten | 210/400 |
| 4,421,645 | 12/1983 | Creps et al. | 210/400 X |
| 4,514,301 | 4/1985 | Parshall | 210/400 |

FOREIGN PATENT DOCUMENTS 899078 1/1982 U.S.S.R. ............................. 210/400

*Primary Examiner*—Robert Spitzer
*Attorney, Agent, or Firm*—Willie Krawitz

[57] ABSTRACT

An endless moving filter belt of fine mesh, woven polymeric fibers is provided through which is passed a liquid containing particles, such as from an oil cooking bath. The particles are filtered from the oil bath, and deposited on the belt. The particles are then continuously scraped off the filter belt and onto an endless moving discharge belt where they are dried and carried to waste. The filter belt is continuously flushed by hot, filtered recycle oil.

The system also may be used for filtering sewage, in water clean-up, for separating water and metal particles from milling machines, etc.

20 Claims, 3 Drawing Figures

CONTINUOUS FILTER SCREEN SYSTEM FOR REMOVING PARTICLES FROM A LIQUID

BACKGROUND OF THE INVENTION

This invention relates to a new and improved oil filtering system for removing food particles from a hot oil cooking bath. The system also may be used in water reclamation, including filtering sewage, water clean-up, for separating water and metal particles from milling machines, etc.

Various types of filtering equipment are employed for removing food particles from a hot oil cooking bath, and one system uses a large roll of filter paper that unwinds while the oil bath containing the particles is passed through the moving paper. The unwound paper bearing the particles is then discarded. However, the entire process is messy, and requres collecting and disposing of the paper. Also, the filter paper itself is costly.

Another type of filter system includes an endless moving band of fine wire mesh. Again, the oil and food particles are passed through the band to filter the particles from the oil. However, it is difficult to completely clean the fine wire mesh, and eventually, an unsanitary and odorous condition will occur due to a build up of the food particles. Also, an oil recirculation rate of only about 30 gallons/minute is obtained with this type of filter, but a much higher rate is desired, say in excess of about 50 gallons/minute. Typical oil recirculation rates of about 100-250 gallons/minute, and higher would be preferred.

A filter system should be employed that can be re-used, rather than be discarded, and which can be readily cleaned. The system should also be inexpensive to install, maintain and replace.

THE INVENTION

According to the invention, an apparatus and process are provided for filtering particles from a bath of hot cooking oil. The apparatus comprises an endless moving filter belt of woven polymeric fibers onto which is fed cooking oil containing the particles. The oil is filtered through the belt, leaving the particles behind. The particles are then scraped off the filter belt and onto a continuous moving discharge belt of similar construction.

The food particles on the discharge belt will dry and congeal due to oil drainage from the particles, and this enables them to be readily removed from the belt and discharged to waste. Although the food debris and residue is of an oily or greasy nature that is quite sticky, it has a low adhesion to the polymeric fibers of both the filter and discharge belts, and this enables the debris to be easily removed from the belts. Also, the low adhesion between the filter belt and debris enables the filter belt to be easily cleaned by flushing with hot recirculating residue-free oil. The discharge belt requires less frequent cleaning because the food debris and residue which contact the belt readily become a congealed and dried mass, rather than remaining as a sticky substance.

The type of polymeric fabric employed is chosen for its resistance to wear, and chemical resistance to hot oil. Also, the polymeric fibers should exhibit good non-adhering and inert characteristics to the residue itself. Within the cooking oil temperature range of about 250° F.-400° F., polyester fabric exhibits good mechanical resistance to abrasion, wear, tension and flexing, in addition to good chemical resistance in a hot oil environment.

Depending on the temperature and chemical nature of the process, nylon, polyproylene, polyethylene and fluorinated polymers such as TEFLON also may be used as the fibers. For purposes of complying with FDA requirements, polyester and TEFLON fibers are employed.

Usually, the woven fabric has a mesh size of about 50-400 microns, and a 60-15- micron mesh size is typical. The woven fabric is necessary so that it will retain its structural integrity during use. Use of a woven fabric enables the belt to be mounted along its edges to metal clamps, which form part of a belt drive mechanism. Also, the fibers may contain a filler to improve oxidation and degradation characteristics.

DESCRIPTION OF THE PREFERRED EMBODIMENTS

Figure 2:
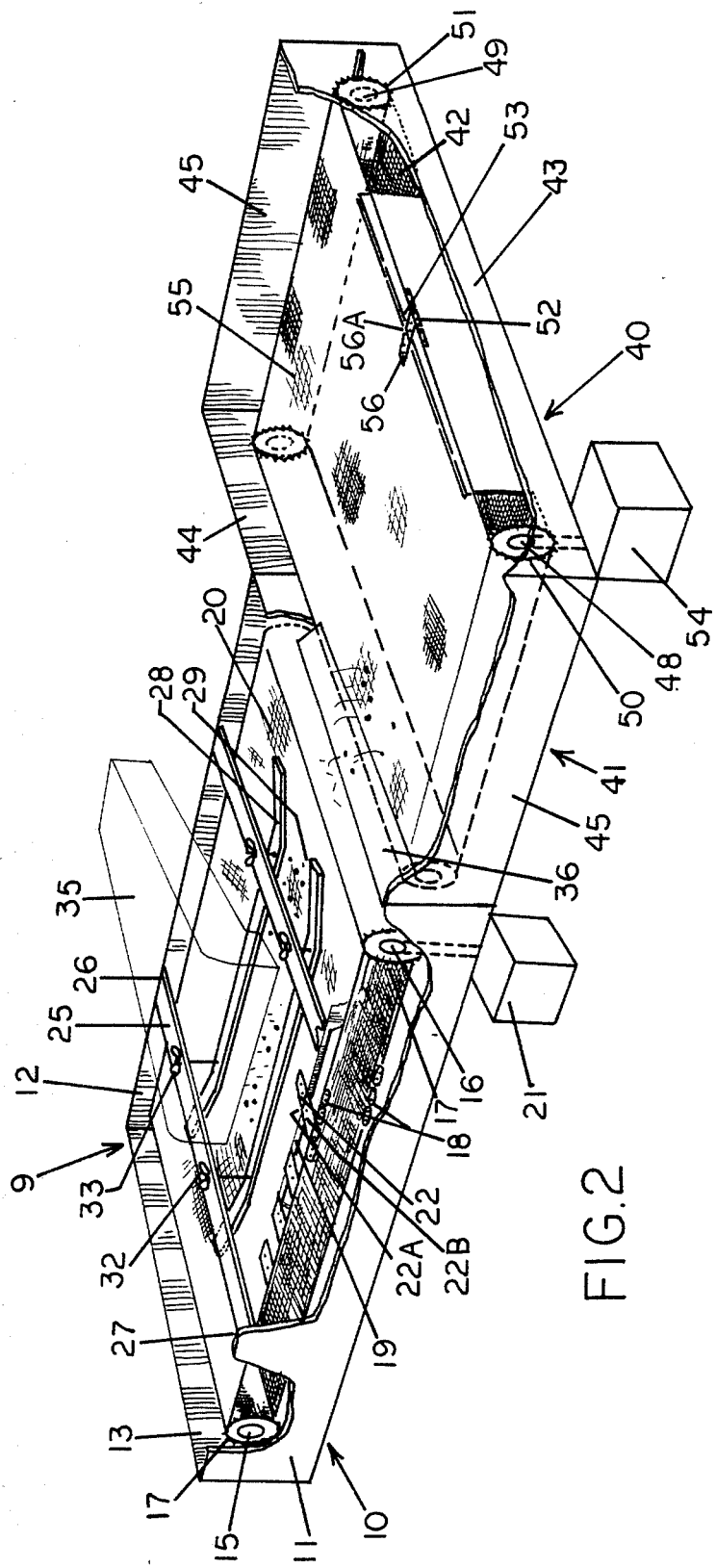
FIG. 2 is an upper perspective view of the apparatus of this invention.
Figure 3:
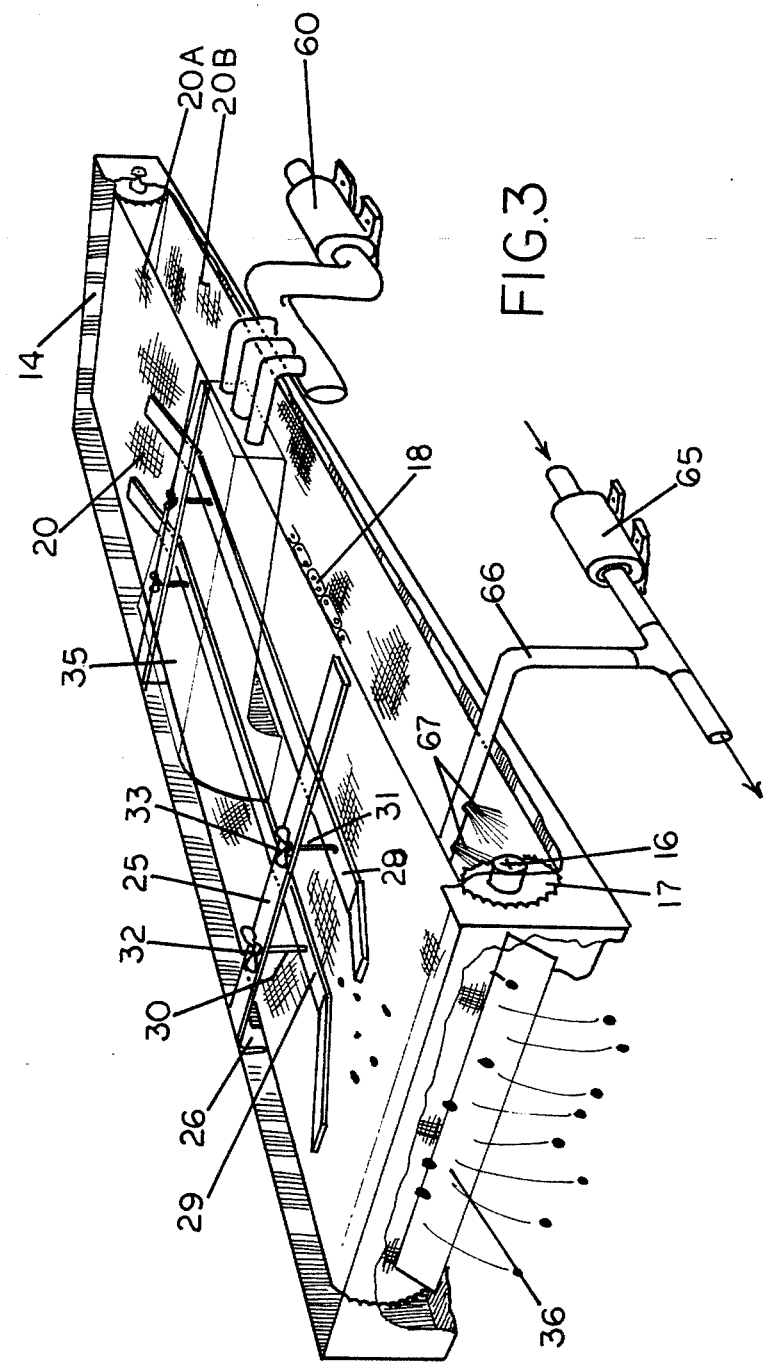
FIG. 3 is an enlarged perspective view of the filter belt with associated components, and oil lines.

The filter system 9 of this invention is shown in FIGS. 2 and 3 and comprises an oil collection tank 10 having sidewalls 11, 12, end walls 13, 14, and a bottom portion (not shown). The tank and other components which contact the oil are manufactured of a corrosion resistant metal such as a 304 stainless steel. Front and rear belt drive shafts 15, 16, are journalled into the sidewalls, and the drive shafts provide sprocket gear drives 17.

Chain links 18 that move within guides 19 are driven by the sprocket gears. An endless filter belt 20 constructed of woven polymeric fabric is carried by the drive shafts 15, 16 and is driven thereby. Typically, the belt thickness may vary from about ½ mil to ⅛".

The entire drive system is powered by a motor 21 connected to the drive shaft. A plurality fo bars 22 are mounted along each side of the belt, and each bar is bent to provide shoulder portions 22a that contact the guides 19. The end portions 22b of the bars are attached to the chain links 18, and hence, the belt is driven by the chain links 18 and the drive shafts 15, 16.

A horizontal support bar 25 is mounted between two vertical support bars 26, 27 attached to the sidewalls 11, 12 of the oil collection tank 10. Tracks 28, 29 are adjustably carried by the pressure support bar 25 by means of rods 30, 31 using wing nuts 32, 33. When hot cooking oil and food debris are fed between the tracks, there will be little tendency for the oil and debris to overflow the tracks. When pressure on the tracks 28, 29 is applied by tightening the wing nuts, the tracks cause the central, longitudinal area of the filter belt 20 to become depressed. The debris laden cooking oil will move along this central portion, and this makes for easier removal (by scraping) of the debris from the filter belt. Also, the confining effect of the tracks and the depressed central portion of the filter belt effectively prevents oil and debris from overflowing the belt edges.

Superposed over a portion of the area between the tracks 28, 29 is an effluent manifold 35 that discharges debris laden cooking oil from a food cooking tank, not shown. The cooking oil passes through the mesh fabric of the belt, and the food debris that remains on the belt is confined on the belt mainly between the tracks 28, 29 as the belt moves along. The debris is carried by the belt to a scraper 36 where it is removed from the belt and transferred to a discharge system 40.

The discharge system 40 includes an oil collecting tank 41 having a bottom 42, side walls 43, 44 and end walls 45. Front and rear belt drive shafts 48, 49 are journalled into the sidewalls 43, 44 and provide sprocket drive gears, two gears 50, 51 being shown. Chain links 52, one link being shown, are driven by the sprocket gears, the links moving between guides 53. The drive shafts, gears and chain links are driven by a motor 54 attached to the drive shaft 48. An endless collection and discharge belt 55, similar to the filter belt 20 is carried by the drive shafts 48, 49 and is driven thereby. A plurality of bars 56 are mounted along each side of the belt, each bar being bent to provide a shoulder portion 56a that contacts the guides 53 and spaces the belt from the guides. The bars are attached to the chain links in the same manner as the bars 22 are attached to the chain links 18.

During use of the filter system of this invention, food cooking oil containing food debris from a cooking operation is pumped to the effluent manifold 35, as previously described, by means of a pump 60. The oil and debris are then passed between tracks 28, 29 and onto the filter belt 20. The debris is then conveyed along by the filter belt and removed by the scraper 36 onto the collection and discharge belt 55. Some of the residual heat in the oil will be transferred to the debris on the filter and discharge belts, and will assist in drying and congealing the debris. This makes it very easy for the debris to be removed to waste from the discharge belt, as shown by the directional arrows. The removal of the debris from the discharge belt may be by scraping, or the debris will simply fall off the belt. Cleaning the belt is only required about once a day.

Figure 1:
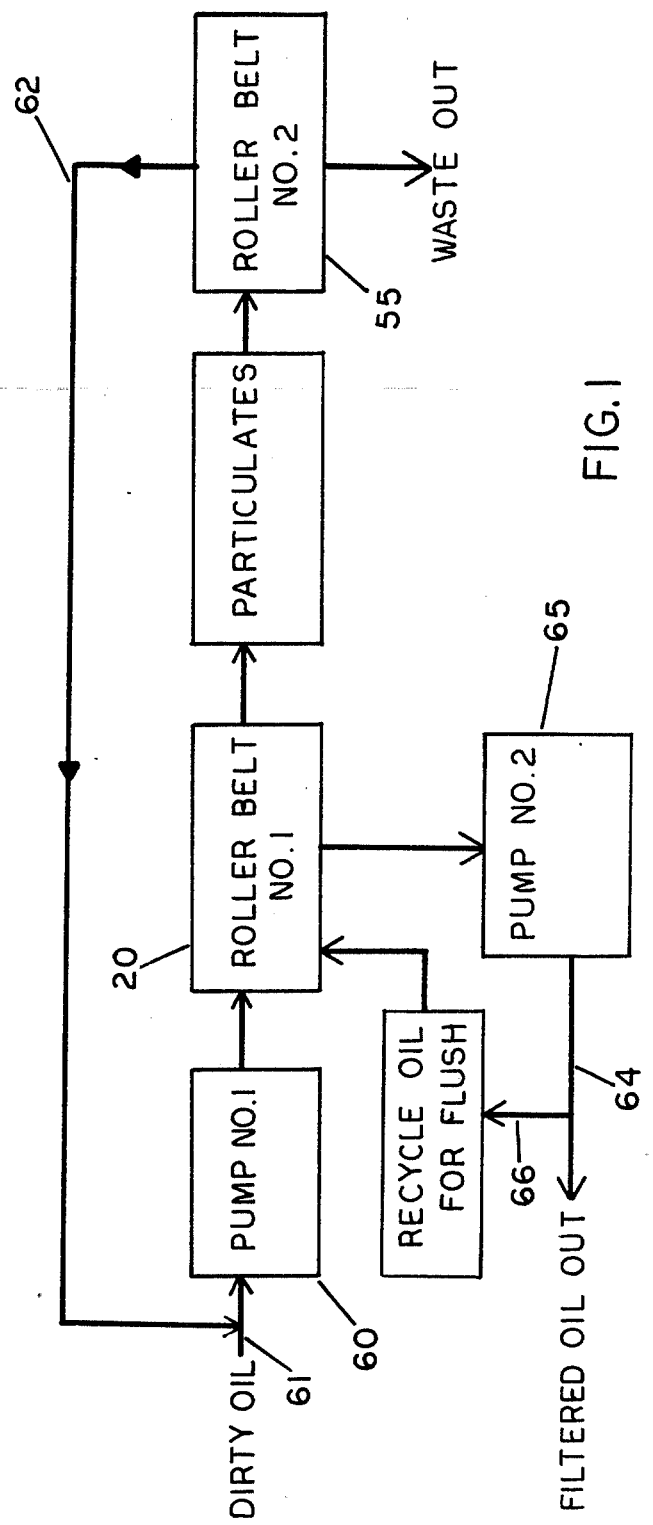
FIG. 1 is a system flow diagram of the invention showing movement of the oil and food particles through the system.

The movement of oil and debris is shown in FIGS. 1 and 3. Cooking oil containing food debris from a food cooking operation is fed through a line 61 and combined with oil in line 62 which is recycled from the bottom of oil collecting tank 41.

The combined oil and debris from lines 61 and 62 is pumped to the manifold 35 by the pump 60 and onto the upper side 20a of the belt 20. The food debris is retained by the belt 20, transferred to the collection and discharge belt 55, and then removed from the system, as described, supra. The filtered oil is collected from the bottom of the oil collection tank 10, and a major portion of this oil is recycled through the line 64 back to the cooking operation using a pump 65. A lesser portion of the oil is recycled, also by means of pump 65, through a line 66 having orifices 67, and sprayed onto the lower side 20b of the belt 20. This spraying action flushes the debris from the belt 20.

Dimensionally, one side of the filter belt 20 may be about 7'×19', and similarly the discharge belt 55 may be about 5'×12". These belt sizes can easily enable filtering of at least 50 gallons/minute of cooking oil, with 100-250 gals./min. being common, and removal of at least about 30 pounds/hr. of debris. Obviously, an increase in oil recycling rates and residue content may necessitate a scale up of the belt dimensions. Typical filter belt speeds are about 10'-100'/min., and the discharge belt speeds are about ½'-10'/minute.

The filter system of this invention enables a high speed continuous filtration of debris from cooking oil, with a simple flushing arrangement that permits a reasonably uninterrupted use of the equipment. Removal of the debris is quick and effective, and does not require the use of filter paper which is expensive, and presents a sanitary and disposal problem. Moreover, operation of the filter system of this invention requires fewer personnel, who need not be too skilled.

Obvious equivalents of this invention are possible without departing from the spirit, thereof. For example, it may be necessary or desireable to flush the discharge belt with filtered oil in the same manner as with the filter belt.

The present invention generally has use in separating relatively small amounts of solids from a large volume of carrier liquid such as in water and sewage clean up, separating metal particles from water in a milling operation, etc.

I claim:

1. An apparatus for continously filtering debris from a carrier liquid, which comprises:
   (a) a first liquid collecting tank, defining an elongate portion;
   (b) an endless filter belt of woven polymeric fabric mesh, the filter belt defining upper and lower surfaces and being rotatable over the elongate portion of the tank and adapted to filter debris from the liquid;
   (c) feed means for supplying liquid and debris to the filter belt along an upper surface, the liquid passing through the belt and collecting in the first collecting tank, and the debris collecting on the upper surface of the filter belt;
   (d) means to remove the debris from the filter belt;
   (e) a second liquid collecting tank defining an elongate portion;
   (f) an endless collecting and discharge belt of woven plastic fabric mesh rotatable along the elongate portion of the second collecting tank, the discharge belt being adapted to collect debris removed from the filter belt and discharge the debris from the apparatus; and,
   (g) liquid recycling means adapted to: i. remove liquid and debris from the second liquid collecting tank and feed the upper surface of the filter belt; ii. remove a portion of filtered liquid from the first collecting tank to flush debris from the lower surface of the filter belt; and, iii. reclaim liquid remaining in the first collecting tank.

2. The apparatus of claim 1, in which the carrier liquid is hot oil from a food cooking operation containing food debris, and the liquid remaining in the first collecting tank is recycled to the food cooking operation.

3. The apparatus of claim 2, in which the filter and discharge belts are constructed of woven fibers selected from the class consisting of polyester, nylon, fluorinated polymers, polypropylene and, polyethylene.

4. The apparatus of claim 3, in which the belt fabric provides a mesh size of at least about 50 microns.

5. The apparatus of claim 4, in which the belt fabric provides amesh size of about 50-400 microns.

6. The apparatus of claim 5, in which the belt fabric is about ½ mil-⅛" thick.

7. The apparatus of claim 6, including elongate, aligned spaced tracks which contact and depress the filter belt centrally, thereby containing debris supplied to the belt between the tracks.

8. The apparatus of claim 7, including a manifold for feeding cooking oil and debris between the spaced tracks, and onto the filter belt.

9. The apparatus of claim 8, including spray bar means for applying oil to the filter belt to flush debris therefrom.

10. The apparatus of claim 9, including scraper means to remove debris from the filter belt to the collecting and discharge belt.

11. The apparatus of claim 1, in which the carrier liquid includes water from sewage treatment, water clean-up, and a metal milling operation.

12. A process for continuously filtering debris from a carrier liquid, which comprises:
(a) feeding liquid and debris to an endless filter belt of woven polymeric mesh fabric along an upper surface, the filter belt being rotatable over an elongate portion of a first collecting tank;
(b) passing the liquid through the belt, collecting the liquid in the first collecting tank, and collecting the debris on the upper surface of the filter belt;
(c) removing the debris from the filter belt onto an endless collecting and discharge belt of woven polymeric fabric mesh, the discharge belt being rotatable over an elongate portion of a second liquid collecting tank;
(d) passing liquid from the discharge belt into the second liquid collecting tank;
(e) drying the debris on the discharge belt;
(f) removing the debris from the discharge belt;
(g) recycling a portion of filtered liquid from the first collecting tank to flush debris from a lower surface of the filter belt; and,
(h) recycling filtered liquid remaining in the first collecting tank.

13. The process of claim 12, which comprises filtering food debris from hot cooking oil produced in a cooking operation, the food debris being dried and congealed on the discharge belt.

14. The process of claim 13, in which the hot cooking oil is at a temperature of about 250° F.–400° F.

15. The process of claim 13, in which the cooking oil is recycled at the rate of at least about 50 gallons per minute.

16. The process of claim 13, in which the cooking oil is recycled at the rate of about 100–250 gallons/minute.

17. The process of claim 13, in which debris is flushed from the filter belt by means of oil passed through a spray bar.

18. The process of claim 13, in which about at least 30 pounds/hour of food debris are filtered from the cooking oil.

19. The process of claim 13, in which the carrier liquid includes water from sewage treatment, water clean-up, and a metal milling operation.

20. The process of claim 13, in which the filter belt speed varies from about 10'–100' feet/minute, and the discharge belt speed varies from about ½'–10'/minute.

* * * * *